United States Patent [19]
Guntin

[11] Patent Number: 5,691,709
[45] Date of Patent: Nov. 25, 1997

[54] COMMUNICATION TRANSCEIVER PROVIDING UNSCHEDULED ACKNOWLEDGE BACK RESPONSES AND METHOD THEREFOR

[75] Inventor: Eduardo Guntin, Parkland, Fla.

[73] Assignee: Motorola, Inc., Schaumburg, Ill.

[21] Appl. No.: 541,852

[22] Filed: Oct. 10, 1995

[51] Int. Cl.$^6$ ............................................. H04Q 7/18
[52] U.S. Cl. ........................ 340/825.44; 340/825.47; 340/825.52; 340/311.1; 379/56; 455/57.1; 455/38.1
[58] Field of Search ................ 340/825.44, 825.47, 340/825.52, 825.68, 825.69, 311.1; 379/56, 57; 455/57.1, 31.1, 38.1

[56] References Cited

U.S. PATENT DOCUMENTS

| | | | |
|---|---|---|---|
| 4,918,437 | 4/1990 | Jasinski et al. | 340/825.44 |
| 4,968,966 | 11/1990 | Jasinski et al. | 340/825.44 |
| 5,162,790 | 11/1992 | Jasinski et al. | 340/825.44 |
| 5,260,700 | 11/1993 | Merchant et al. | 340/825.44 |
| 5,475,863 | 12/1995 | Simpson et al. | 340/825.44 X |
| 5,542,115 | 7/1996 | Wong et al. | 340/825.44 X |

*Primary Examiner*—Michael Horabik
*Assistant Examiner*—William H. Wilson, Jr.
*Attorney, Agent, or Firm*—Philip P. Macnak

[57] ABSTRACT

A communication transceiver (510) having a receiver (704), a controller (714) and a transmitter (710), is used for generating an unscheduled acknowledge back response. The receiver (704) receives an address and a color code identifying the cell transmitter (506) transmitting the address during a first scheduled time interval (212). The controller (714) selects, in accordance with the address received, a reserved response time slot from a predetermined number of reserved response time slots occurring during a second scheduled time interval. The transmitter (710) then transmits the unscheduled acknowledge back response during the reserved response time slot (224) selected.

20 Claims, 12 Drawing Sheets

5,691,709

1

COMMUNICATION TRANSCEIVER PROVIDING UNSCHEDULED ACKNOWLEDGE BACK RESPONSES AND METHOD THEREFOR

FIELD OF THE INVENTION

This invention relates in general to communication transceivers for use in two-way radio communication systems, and more specifically to communication transceivers which generate unscheduled acknowledge back responses.

BACKGROUND OF THE INVENTION

Prior art communication systems utilizing time or frequency reuse have relied on scheduled predetermined acknowledge back response time slots for providing transmission times for acknowledge back responses which were used for tracking of the communication transceivers to provide message delivery. In the prior art systems, acknowledge back responses were collision free because the acknowledge back response time slots were specifically assigned on the basis of the message number within the message queue received by the communication transceivers. Although such collision free inbound messaging is an attractive feature from a message batching or queuing standpoint, communication systems utilizing this method were generally limited to the number of communication transceivers which could be queried at one time because of the number of acknowledge back response time slots which had to be scheduled.

In most cases, as the number of customers serviced by the communication system increased, the number of messages required to be delivered increased accordingly. As a result, limits had to be placed on the size of the batch that could be queued for message delivery to communication transceivers operating within the communication system in order to provide time for acknowledge back responses, which resulted in increased message delivery latency. Under heavy traffic conditions, such increase in message delivery latency could become unacceptable to both the person attempting to deliver a message to an intended party and to the intended party receiving the message.

Thus what is needed is a communication transceiver which can generate unscheduled acknowledge back responses, thereby reducing the message delivery latency. What is also needed is a method by which a communication transceiver, operating within a communication system which provides time division duplex operation, can generate unscheduled acknowledge back responses, thereby increasing the message delivery throughput and reducing the message delivery latency.

2

Figure 5:
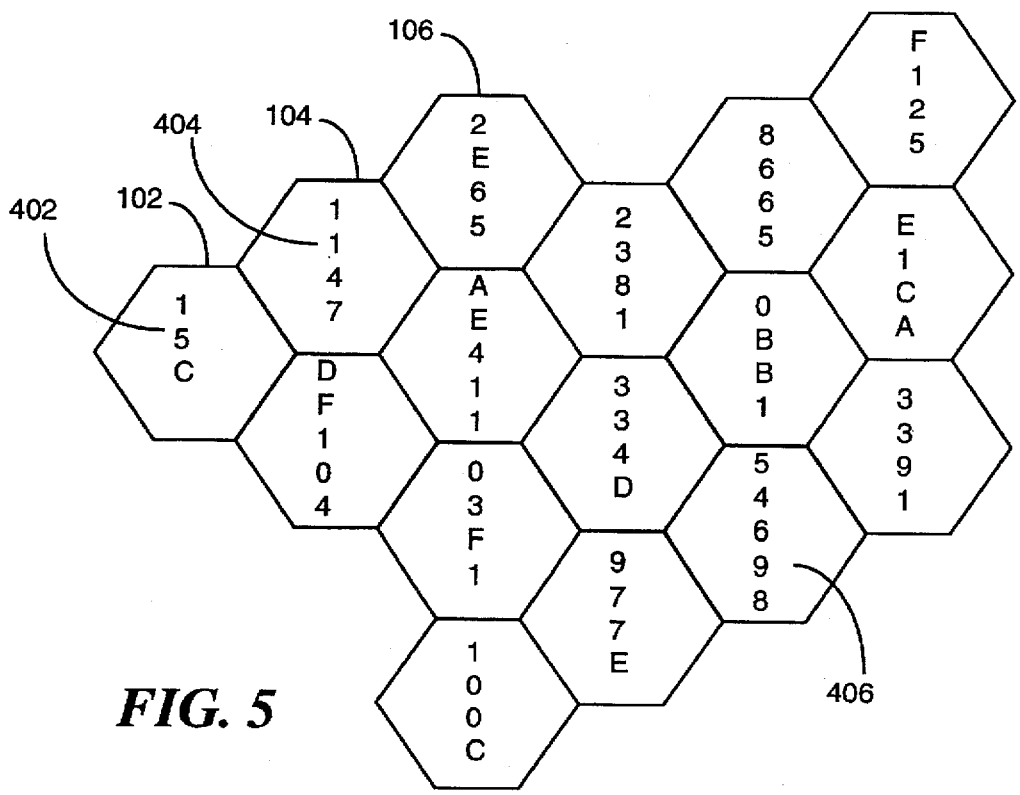

FIG. 5 is a composite diagram depicting a random distribution of communication transceivers and their associated random number in accordance with the present invention.

Figure 1:
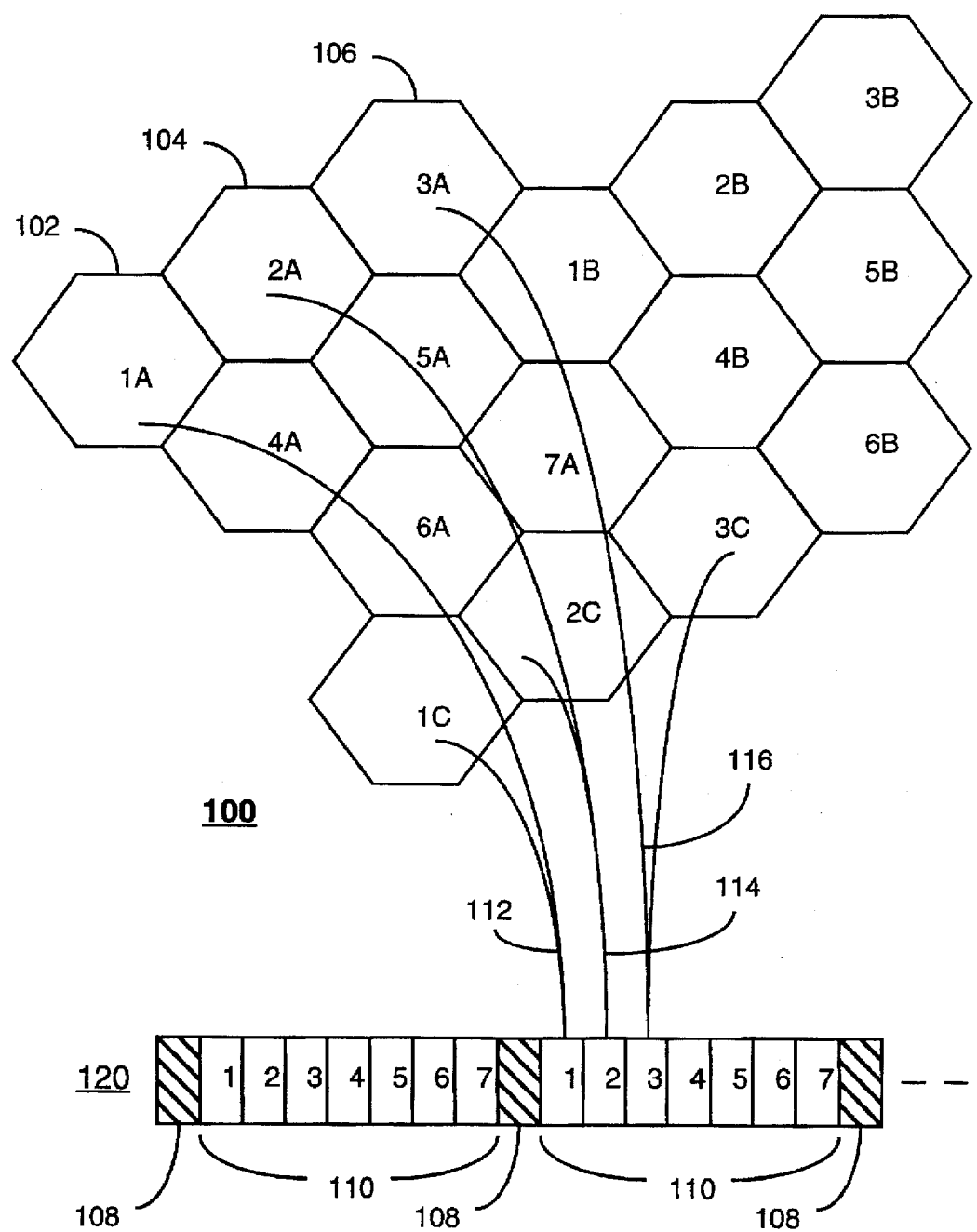
FIG. 1 is a composite diagram depicting a communication system and associated communication protocol which provides minimum transmission delay for message delivery to a communication transceiver in accordance with the present invention.
Figure 6:
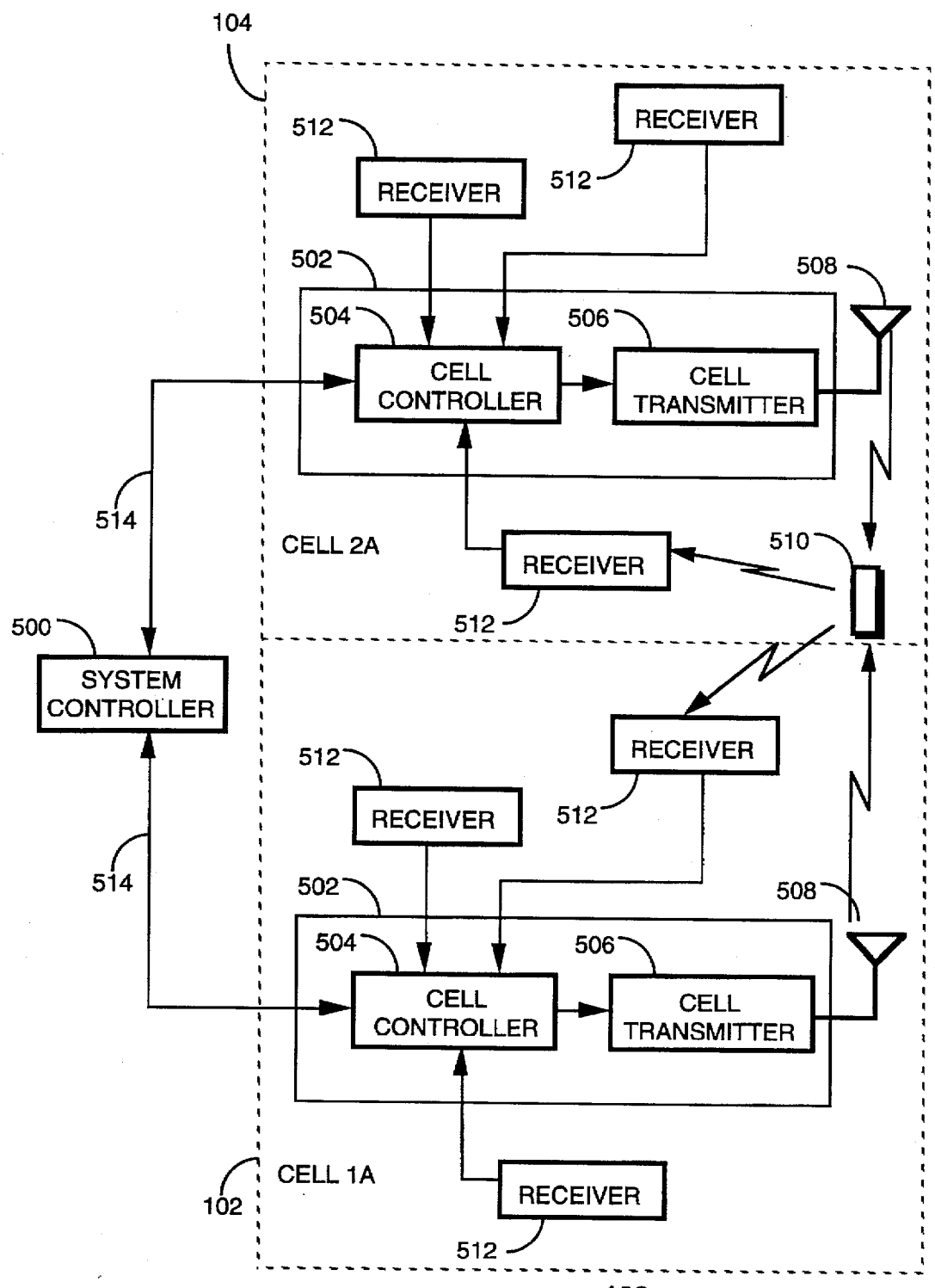

FIG. 6 is an electrical block diagram of the communication system of FIG. 1 in accordance with the present invention.

Figure 7:
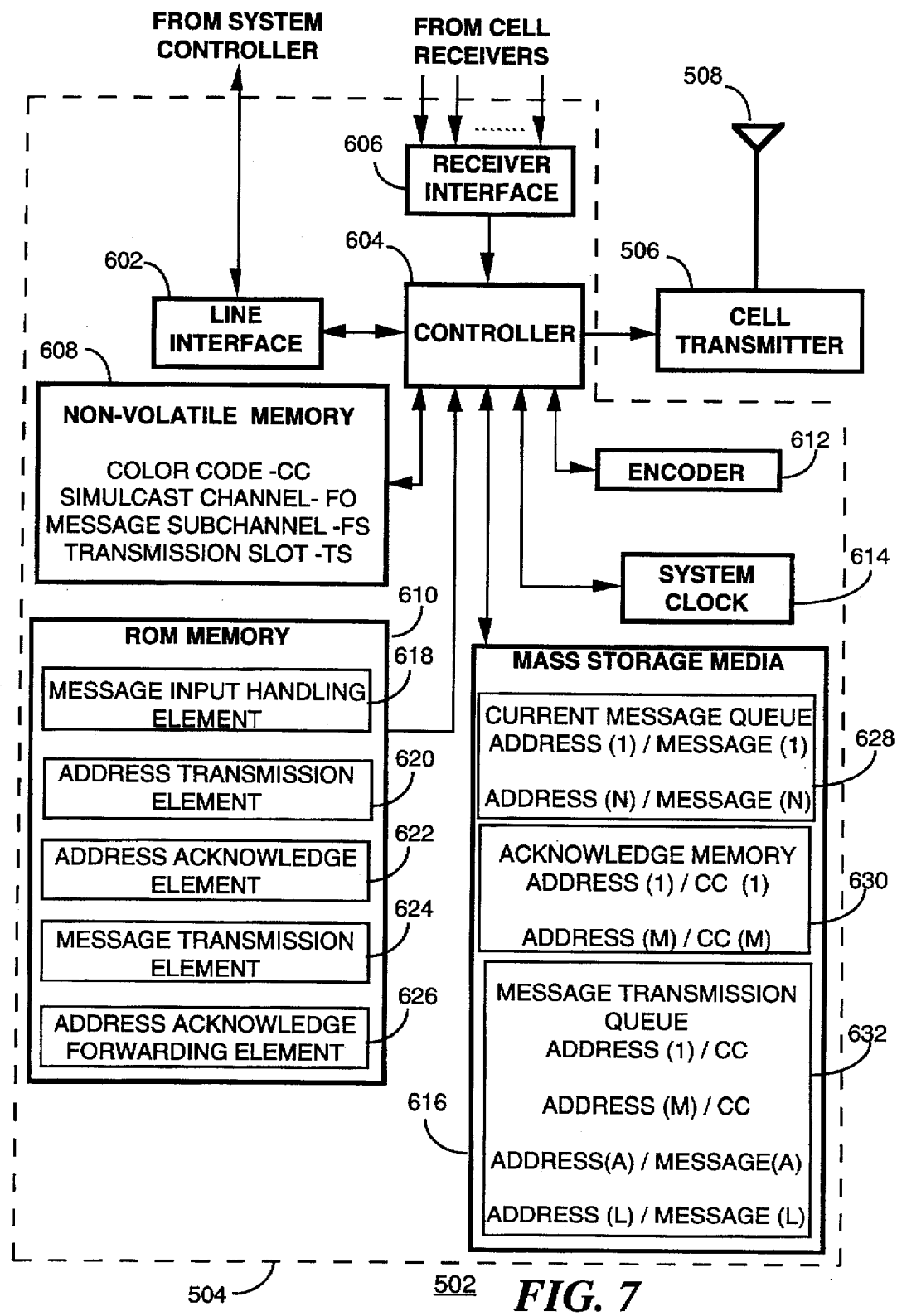

FIG. 7 is an electrical block diagram of a transmitter utilized in the communication system of FIG. 5 in accordance with the present invention.

Figure 8:
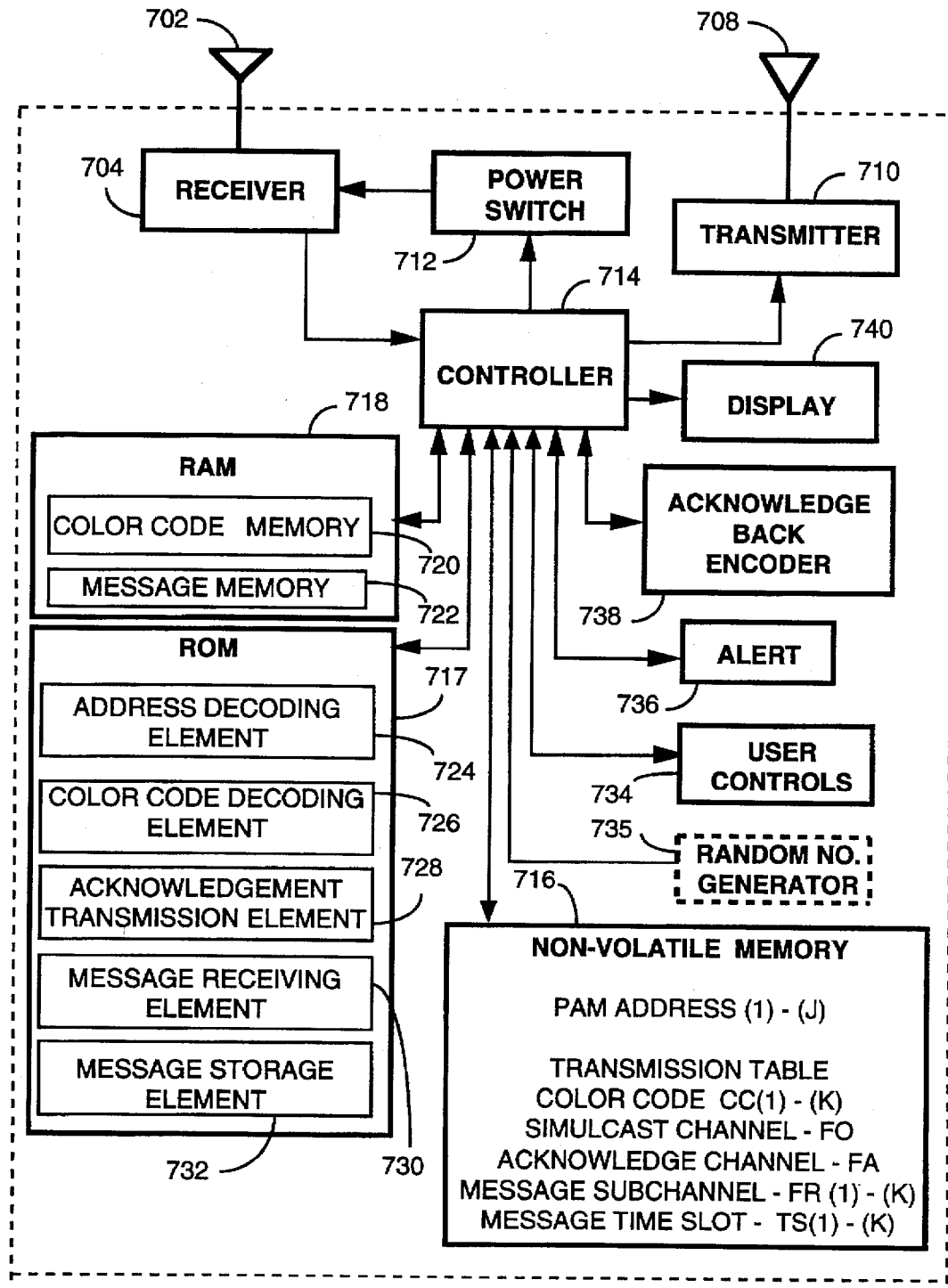

FIG. 8 is an electrical block diagram of a communication transceiver utilized in the communication system of FIG. 5 in accordance with the present invention.

FIGS. 9–14 are flow charts illustrating the operation of the communication system of FIG. 6 in accordance with the present invention.

DESCRIPTION OF THE PREFERRED EMBODIMENTS

FIG. 1 is a composite diagram which depicts a communication system 100 which utilizes time division duplex communication and associated communication protocol 120 which provides for unscheduled acknowledge back responses to be generated by a plurality of communication transceivers operating within the communication system 100 to provide minimum transmission delay for message delivery to the communication transceiver in accordance with the present invention. The communication system 100 comprises a plurality of transmission cells, shown as transmission cell 102, transmission cell 104, and transmission cell 106 which define geographical transmission areas within a simulcast communication system, such as is well known to one of ordinary skill in the art. Each of the plurality of transmission cells includes one or more cell receivers and a cell transmitter, as will be described in detail below. The communication protocol 120 includes a control frame 108 followed by a plurality of transmission frames 110 which are labeled by way of example 1–7. The control frame 108 and transmission frames 110 will be described in further detail below. As shown in FIG. 1, the communication system 100 is organized to provide frequency re-use, and by way of example a seven-cell frequency re-use pattern (cells 1A–7A, 1B–7B, etc.) is shown, although it will be appreciated that other frequency re-use patterns providing more or less cells can be utilized as well. During the frequency re-use portion of the communication protocol 120, message transmissions occur in a predetermined sequence, i.e. during a first transmission frame 112 in transmission cells 1A, 1B, 1C, etc., during a second transmission frame 114 in transmission cells 2A, 2B, 2C, etc., during a third transmission frame 116 in transmission cells 3A, 3B, 3C, etc., and so forth. It will be appreciated from the description provided above, that when the number of transmission cells within the cell frequency re-use pattern is increased, there is a corresponding increase in the number of transmission frames 110 provided, and likewise, when the number of transmission cells within the cell frequency re-use pattern is decreased, there can be a corresponding decrease in the number of transmission frames 110 provided, as will be described in further detail below.

In summary, the communication protocol 120 provides a predetermined transmission sequence which allows for the transmission of messages directed to communication transceivers operating within the transmission cells without the problems inherent to simulcast transmission. The communication protocol 120 includes a control frame which is simulcast transmitted from all cell transmitters within the communication system 100, and which is followed by a plurality of transmission frames which are transmitted as non-simulcast transmissions in a predetermined sequence from each of the cell transmitters.

Figure 2:
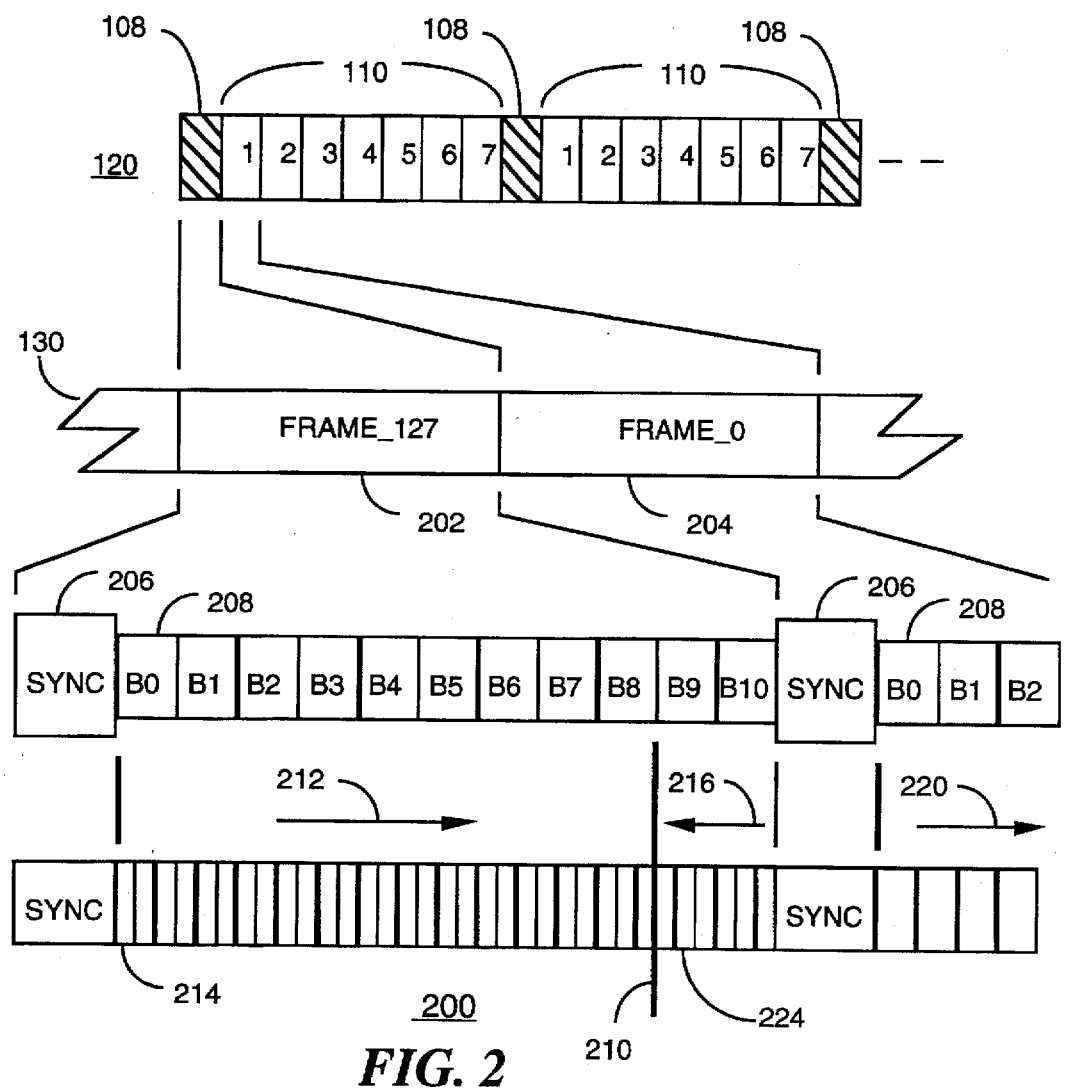
FIG. 2 is a signaling diagram of the communication protocol of FIG. 1 in accordance with the present invention.

FIG. 2 is a signaling diagram illustrating the communication protocol 120 of FIG. 1 in accordance with a first embodiment of the present invention. The control frame 108 and transmission frames 110 correspond to frames 202, 204, etc. of a synchronous signaling protocol 130, such as the FLEX™ signaling protocol. The FLEX signaling protocol is described herein by way of example, and it will be appreciated that other synchronous signaling protocols can be utilized as well to provide minimum transmission delay for message delivery to a communication transceiver.

The synchronous signaling protocol 130 includes, by way of example, one hundred and twenty eight frames numbered frame_0 204 through frame_127 202. Any of the one hundred and twenty eight frames can be designated as a control frame 108 or transmission frame 110. However, it will be appreciated that the designation is generally dictated by the number of transmission cells within the cell frequency re-use pattern. For the seven cell re-use pattern illustrated in FIG. 1, one control frame 108 and seven transmission flames 110 would be sequentially repeated sixteen times within the one hundred and twenty eight frames of the synchronous signaling protocol 130.

The control frame 108 provides control information which is transmitted during a first scheduled time interval, outbound transmission time interval 212, to communication transceivers which operate within the communication system. A second portion of the control frame 108 is further used to receive acknowledge back responses generated by the communication receivers during a second scheduled time interval, inbound transmission time interval 216. The acknowledge back responses are used for locating the communication transceivers, as will be described in detail below. The information transmitted during the outbound transmission time interval 212 and the inbound transmission time interval 216 is transmitted on a single RF channel, or frequency, thus providing a time division duplex (TDD) arrangement for outbound and inbound information on the channel. Once the communication transceivers have been located, messages directed to the communication transceivers are transmitted during the ensuing transmission frames 110. While only a single control frame 108 is shown, it will be appreciated that several control frames can be transmitted in a sequence depending upon channel loading, thereby increasing the outbound channel throughput which is used for locating the communication transceivers for which messages are directed.

Frames 202, 204, etc. include by way of example a synchronization portion 206 followed by eleven transmission blocks 208 (identified as B0 through B10). The boundary 210 between the outbound transmission time interval 212 and the inbound transmission time interval 216 is defined as the boundary between two transmission blocks, one providing an end to the outbound message transmission and one providing a start of the inbound message transmission, respectively. In one embodiment of the present invention, the boundary 210 is fixed thereby providing a predetermined number of transmission time slots 214 available for outbound message transmissions, and a predetermined number of reserved response time slots 224 available for inbound message transmissions. In a second embodiment of the present invention, the boundary 210 is variable, thereby providing a variable number of transmission time slots 214 available for outbound message transmissions, and a variable number of reserved response time slots 224 available for inbound message transmissions as will be described further below.

A portion of the inbound transmission time interval 216 is reserved for unscheduled acknowledge back responses during reserved response time slots 224. Unscheduled acknowledge back responses are those responses generated by a communication transceiver which are not previously assigned a time slot by the communication system 100 for acknowledge back response transmission. The number of reserved response time slots 224 provided limits the number of outbound addresses which can be transmitted by the communication system 100 as will be described below. Typically, the number of reserved response time slots 224 are pre-programmed within the communication transceivers, although it will be appreciated that the number can also be changed when the capability to provide over-the-air (OTA) reprogramming within the communication system 100 is provided.

In accordance with the present invention, each of the transmission blocks 208 within the control frame 108 are transmitted within the outbound transmission time interval 212 and comprise by way of example eight code words which represent either address code words, vector code words, data code words or idle code words, while each of the transmission blocks 208 within the inbound transmission time interval 216 also comprise by way of example eight code words which represent acknowledge back responses and which include address code words identifying the communication transceiver responding, and data code words providing transmitter IDs, or color codes, as will be described in further detail below. Each of the transmission blocks 208 which are transmitted within the outbound data transmission 220 in transmission frames 110 also comprise by way of example eight code words and represent address code words and data code words and are only transmitted within the transmission cells in which the communication transceivers are located, as described above.

The communication protocol 120 includes a control frame 108 which is transmitted in a simulcast transmission from all cell transmitters within the communication system 100, followed by a plurality of transmission frames 110 which are transmitted in a non-simulcast transmission by the cell transmitters of the communication system 100 transmitting in a predetermined sequence as described above. In operation, it will be appreciated that messages intended for communication transceivers do not immediately follow the transmission of the control frame 108, but rather the messages transmitted during the transmission frames 110 immediately following the control frame 108 transmission, are generally messages intended for communication transceivers which were located during a previous control frame transmission, as will be explained in further detail below.

Figure 3:
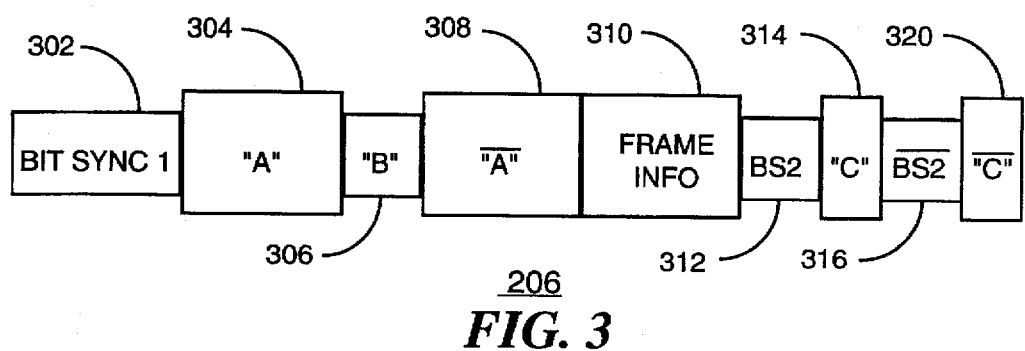
FIG. 3 is a signaling diagram of the synchronization code word utilized in the communication protocol of FIG. 2.

FIG. 3 is a signaling diagram of the synchronization code word 206 utilized in the communication protocol of FIG. 2. The synchronization code word 206 includes two portions, a first sync portion or sync "1" and a second sync portion or sync "2". Sync "1" comprises a bit sync "1" code word 302, an "A" code word 304, a "B" code word 306 and an "A" bar code word 308. Sync 2 comprises a bit sync "2" code word 312, a "C" code word 314, a bit sync "2" bar code word 316 and a "C" bar code word 320. Sync "1" is transmitted preferably at 1600 bits per second and provides a means for obtaining frame timing, and also provides the transmitter ID, or color code, as will be described in further detail below. Sync 1 can also provide information designating the frame block speed, or bit rate at which the rest of the frame is transmitted. The frame info word 310 is also transmitted preferably at 1600 bits per second and carries a frame number, a cycle number and other information. Sync "2" provides synchronization at the frame block speed designated by sync "1".

The transmitter ID described above is provided by way of example by information delivered in the "B" code word 306 which is a sixteen bit code word preferably encoded using a 16,5 Bose, Chaudhuri, Hocquernghem (BCH) encoding format. To reduce the possibility of false transmitter identification, only a subset of one hundred and twenty-eight predetermined code words of the possible 16,5 BCH code words are utilized to provide transmitter IDs, or color codes. Additional information on the general use of color codes is found in U.S. patent application Ser. No. 08/131,243 filed Oct. 4, 1993 by Simpson et al., entitled "Method and Apparatus for Identifying a Transmitter in a Radio Communication System" which is assigned to the assignee of the present invention, and which is incorporated by reference herein.

Figure 4:
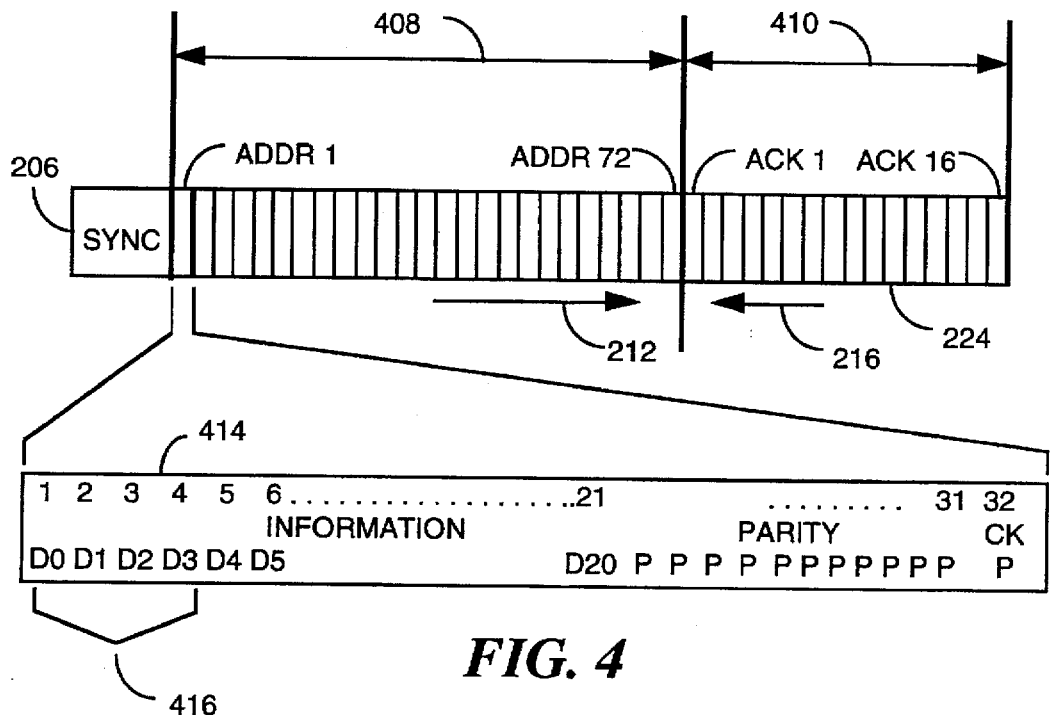
FIG. 4 is a signaling diagram illustrating an example of outbound and inbound messaging utilizing the communication protocol of FIG. 2 in accordance with the present invention.

FIG. 4 is a signaling diagram illustrating an example of outbound and inbound messaging utilizing the communication protocol of FIG. 2 in accordance with the present invention. As described above, there are eleven transmission blocks 208 within a control frame 108, each comprising eight code words. Thus, eleven transmission blocks 208 provide a total of eighty eight time slots for code word transmission. In a TDD system, as described above, the reserved response time slots 224 are reserved for inbound message transmission. The number of reserved response time slots 224 is either fixed by the communication system 100 or variable, utilizing OTA programming. As shown in FIG. 4, sixteen reserved response time slots 224 have been reserved for inbound unscheduled acknowledgment responses (ACK0 through ACK15) during time interval 410. The remaining seventy two transmission time slots 214 are utilized for transmission of seventy two addresses (ADDR0 through ADDR71) during time interval 408. Each address code word 414 preferably includes twenty one address bits of information with an associated eleven bits of parity for BCH encoding. In one embodiment of the present invention, the least significant bits of the address 416 (D0 through D3) are utilized for selection of one of the sequence of sixteen reserved response time slots 224 for the transmission of unscheduled acknowledge back responses, the sixteen reserved response time slots corresponding to the last sixteen code words transmitted within the control frame 108. All other elements and aspects of the operation of the communication protocol of FIG. 1 remain as described for FIG. 2 above. Thus, by way of example, a communication transceiver which is assigned an address code word in which the least significant bits are "0001" would automatically provide an unscheduled acknowledge back response ACK1 during the first reserved response time slot.

FIG. 5 is a composite diagram depicting a random distribution of communication transceivers such as would be found within a communication system 100 in accordance with the present invention. The communication system 100 shown comprises a plurality of transmission cells 102, 104, 105 which define geographical transmission areas within a simulcast communication system as described above. Each transmission cell includes a plurality of communication transceivers identified by single digit (or nibble) hexadecimal numbers (ranging from 0 through F, or equivalently from 0 through 15 base 10-decimal). In a first embodiment of the present invention, each hexadecimal number shown corresponds to the least significant hexadecimal digit of the address assigned to a communication transceiver. In a second embodiment of the present invention, each hexadecimal number corresponds to the least significant hexadecimal digit of the address assigned to the communication transceiver which is further randomized using a random number generator as will be described below.

The distribution of communication transceivers shown in FIG. 5 assumes that the communication transceivers are generally randomly distributed throughout the communication system 100, and that the number 402, 404, and 405 of communication transceivers located within any given transmission cell is random as well. A first order approximation of the probability of a collision for two or more communication transceivers selecting the same inbound time slot within the same transmission cell can be determined from the expression $$P_{COLL} = \frac{N_{ADD}}{N_{CELL} \cdot N_{RCVR} \cdot N_{TS}} \times 100\%$$

where $P_{COLL}$ is the probability of a collision, $N_{ADD}$ is the number of simulcast addresses transmitted in the control frame 108, $N_{CELL}$ is the number of cells within the communication system 100, $N_{RCVR}$ is the number of cell, or acknowledge back response receivers per cell, and $N_{TS}$ is the number of reserved response time slots 224 available per cell receiver. Utilizing the number of addresses and reserved response time slots 224 demonstrated in FIG. 4 (i.e., $N_{ADD}$= 72, $N_{TS}$=16), and assuming there are forty cells in the communication system 100, and three receivers per cell, as shown in FIG. 6, the probability of a collision is $$P_{COLL} = \frac{72}{40 \cdot 3 \cdot 16} \times 100\% = 3.75\%$$

As shown by the example above, approximately 96% of the communication transceivers would respond collision free for each group of 72 communication transceivers which were addressed. It will be appreciated that the actual collision probability can be improved such as by randomizing further the least significant address bits identifying the communication transceiver, or by utilizing a different system configurations than the ones described herein.

In summary, a communication system 100 utilizing unscheduled acknowledge back responses transmitted during reserved response time slots 224 and used for tracking a plurality of communication transceivers can provide efficient channel bandwidth utilization as described above. In contrast to prior art systems which utilize scheduled acknowledge back responses, the present invention improves the latency of message delivery, as well as the overall capacity of the communication system 100.

FIG. 6 is an electrical block diagram of the communication system 100 of FIG. 1 in accordance with the present invention. The communication system 100 includes a system controller 500 which receives message inputs from message originators such as through the use of the public switched telephone network (PSTN), in a manner well known to one of ordinary skill in the art. The messages are processed in a manner to be described below, prior to distribution of the messages to a plurality of base stations 502, of which two base stations 502 are shown by way of example in transmission cell 102 and transmission cell 104, and which are designated as Cell 1A and Cell 2A, respectively. The distribution of the messages between the system controller 500 and the base stations 502 is accomplished using a message distribution system 514 which is well known, such as a direct wireline (telephone) link, a data communication link, or any of a number of radio frequency links, such a an RF link transmitter/link receivers, a microwave transmission link or a satellite transmission link, just to name a few.

The base stations 502 include a cell controller 504 having an input coupled to the message distribution system 514 and an output coupled to the input of a cell transmitter 506. The output of the cell transmitter 506 couples to an antenna 508. The outputs of one or more cell receivers 512, three of which are shown by way of example in each transmission cell 102, 104, are coupled to receiver inputs of the cell controller 504. Messages distributed from the system controller 500 over the message distribution system 514 are received at the input of the cell controller 504, which then stores the messages. At an appropriate time, as described above, the addresses of a communication transceiver 510 for which messages are directed are recovered from memory and are processed to add a transmitter ID, also referred to as a color code which uniquely identifies the cell transmitter 506 which transmits the addresses. In the preferred embodiment of the present invention, there are one hundred and twenty-eight unique transmitter ID's allowing up to one hundred and twenty-eight transmitters within a given geographic area to be uniquely identified. The addresses and color codes identifying the transmitters transmitting the messages are coupled to the input of cell transmitter 506 which then transmits the addresses and color codes in a manner well known to one of ordinary skill in the art. The addresses and color codes transmitted are received by any communication transceivers 510 within the transmission cells, of which one communication transceiver 510 is shown by way of example. When one of the addresses transmitted is the same as a predetermined address assigned to the communication transceiver 510, the color code of the transmitter transmitting the message is received and stored by the communication transceiver 510.

Following the reception of the address identifying the communication transceiver 510, the communication transceiver 510 generates an acknowledge back response which includes the address and color code identifying the transmitter which transmitted the address, thereby locating in which transmission cell 102, 104 the communication transceiver 510 is located. As shown in FIG. 6, the communication transceiver 510 can potentially receive the address and color code transmitted by the transmitter in transmission cell 102 or transmission cell 104. While cell transmitter 506 in transmission cell 102 is transmitting a different color code as compared to the cell transmitter 506 of transmission cell 104, normally the transmission from one of the transmitters captures the communication transceiver 510, thus only the color code of the transmitter having the strongest signal is received. In those instances where the signal strength from both the cell transmitter 506 in transmission cell 102 and transmission cell 104 are substantially identical, the address and both color codes are received. One attribute of the one hundred and twenty-eight unique color codes is that the code words are orthogonal, such that when several color codes are simultaneously received, the color codes of both transmitters can be individually identified in a manner well known to one of ordinary skill in the art. In such an instance, the communication transceiver 510 would select the color code of one of the two transmitters, according to a predetermined selection criteria, for transmission in the acknowledge back response as described above.

The acknowledge back response transmission can be received by one or more cell receivers 512 in one or more transmission cells 102, 104 depending upon the location of the communication transceiver 510. Irrespective of the number of cell receivers 512 receiving the acknowledge back response, the communication transceiver 510 address and color code received within the acknowledge back responses are forwarded to the cell controllers 504 of the cell receivers 512 receiving the address and the color code. The color code not only identifies which transmitter transmitted the address, but also identifies, as will be described below, in which transmission frame 110 the actual message will be delivered to the communication transceiver 510. Hence, by identifying the color code, the communication transceiver 510 knows in which transmission frame 110 the message will be delivered. By eliminating the need for any further transmission of information between the base station 502 and the communication transceiver 510 the transmission delay for message delivery to the communication transceiver 510 is minimized in accordance with the present invention. Moreover, because the transmission frames 110 are identified in the manner described above, the communication transceiver 510 can battery save during those transmission frames 110 in which the message will not be delivered.

In summary, during a first portion of the control frame 108 which represents a first scheduled transmission time interval and which by way of example corresponds to the outbound transmission time interval 212 of frame__127 202 of FIG. 2, an address identifying a communication transceiver 510 for which a message is intended is simulcast transmitted together with a color code signal identifying the base station 502 from which the address transmission occurred. During a second portion of the control frame 108 which represents a second scheduled time interval and which by way of example corresponds to the inbound transmission time interval 216 of frame__127 202, acknowledge back responses are received by at least one cell receiver 512 of the one or more cell receivers located within the plurality of transmission cells. The acknowledge back response includes the color code signal identifying the base station 502 transmitting the address which was received by the communication transceiver 510. Once the communication transceiver 510 is located, the cell transmitter 506 identified by the color code signal received by the at least one cell receiver 512 of the one or more cell receivers transmits the address identifying the communication transceiver 510 for which a message is intended and the message. The address and message are transmitted during a selected one of a plurality of scheduled message reuse slots designated by the color code signal identifying the base station 502. The communication transceiver 510 also receives the address and message during the selected one of a plurality of scheduled message reuse slots. The address and message transmission is made without any additional communication between the base station 502 and the communication transceiver 510, thereby minimizing the transmission delay for message delivery to the communication transceiver 510.

FIG. 7 is an electrical block diagram of a base station 502 utilized in the communication system of FIG. 6 in accordance with the present invention. The base station 502 includes the cell controller 504, the cell transmitter 506 and antenna 508 as described above. The cell controller 504 includes a line interface 602, a controller 604, a receiver interface 606, a non-volatile memory 608, a read only memory 610, an encoder 612, a system clock 614 and a mass storage media 616. The line interface 602 couples the cell controller 504 to the system controller 500 via the message distribution system 514 described above. The line interface 602 provides an output which is coupled to an input of the controller 604. The controller 604 controls the processing of message information distributed from the system controller 500. The controller 604 is preferably implemented using a microcomputer such as a MC68XXX series microcomputer or a digital signal processor such as a DSP56XXX digital signal processor manufactured by Motorola Inc. of Schaumburg, Ill., and can also be implemented using a personal computer or computer workstation as well. The receiver interface 606 couples the cell controller 504 to the one or more cell receivers 512 which are located within the geographic transmission area of the base station 502. The output of the receiver interface 606 is coupled to an input of the controller 604 which also controls the processing of addresses and associated color codes received from the cell receivers 512, as will be described in further detail below.

The non-volatile memory 608 is coupled to the controller 604 and stores information necessary for the operation of the cell transmitter 506 and for the processing of the message information distributed from the system controller 500. The non-volatile memory 608 stores such information as a color code (CC) assigned to the base station 502, the frequency (FO) of the outbound transmission channel used for simulcast transmission, a message sub channel frequency (FS) when a frequency other than the simulcast frequency (FO) is utilized for non-simulcast message transmission, and the transmission slot (TS) which is assigned to the base station 502 for the non-simulcast delivery of the messages to the communication transceiver 510. The non-volatile memory 608 can be integrated as a part of the microcomputer or digital signal processor or can be an external memory device implemented using any of a number of well known non-volatile memory devices, such as electrically erasable programmable read only (EEPROM) memory, "flash" memory, electrically programmable read only (EPROM) memory and other well known non-volatile memory devices.

The read only memory (ROM) 610 can be integrated as a part of the microcomputer or digital signal processor or can be implemented using an external memory device as described above. The read only memory (ROM) 610 stores firmware routines necessary for controlling the operation of the base station 502 as will be described in further detail below. The firmware routines preferably programmed within the read only memory 610 include, but are not limited to, a message input handling element 618 which controls the reception and temporary storage of addresses and associated messages distributed by the system controller 500; an address transmission element 620 which controls queuing and transmission of addresses and color codes for simulcast transmission; an address acknowledgment element 622 which controls reception and temporary storage of acknowledge back responses forwarded from the one or more cell receivers 512; a message transmission element 624 which controls the transmission of addresses and color codes during the control frame 108, controls the identification of addresses flagged by the color code assigned to the base station and recovery of the messages associated therewith, and further controls the non-simulcast transmission of the addresses and messages to the communication transceivers 510 which were located within the transmission zone of the base station; and an address acknowledge forwarding element 626 which controls the processing of acknowledge back responses received by the cell receivers for transmission back to the system controller 500 as will be described in detail below.

The encoder 612 is coupled to the controller 604 and is responsive to the message transmission element 624 for encoding the address and the color code in the communication protocol utilized for transmission of the acknowledge back response. The system dock 614 is coupled to the controller 604 and provides the timing signals utilized by the controller 604 for controlling the reception of the address, color code and message signals during the outbound message transmissions, and also for controlling the transmission of the acknowledge back responses during the inbound message transmissions.

The mass storage media 616 provides temporary storage of address and associated message information distributed by the system controller 500. The mass storage media 616 is implemented using random access memory, a hard disk drive or other well known mass storage devices. The mass storage media 616 provides several message queues, a current message queue 628, an acknowledge memory 630 and a message transmission queue 632. The current message queue 628 stores the addresses and associated messages distributed from the system controller 500 on a batch basis. The acknowledge memory 630 stores all addresses and associated color codes received by the one or more cell receivers. The message transmission queue 632 stores the addresses and associated color code to be transmitted during the control frame 108, and further stores the addresses and associated messages to be transmitted during the assigned non-simulcast transmission frames 110.

FIG. 8 is an electrical block diagram of a communication transceiver 510 utilized in the communication system 100 of FIG. 6 in accordance with the present invention. The communication transceiver 510 comprises a receiver antenna 702 and transmitter antenna 708 for intercepting RF signals from the base stations 502 and for transmitting RF signals to the base stations 502, respectfully. The receiver antenna 702 is coupled to a receiver 704, which is well known to one of ordinary skill in the art, for demodulating the RF signals received from the base stations 502. The transmitter antenna 708 is coupled to a transmitter 710, which is well known to one of ordinary skill in the art, for modulating RF signals transmitted to the base stations 502.

The RF signals received from the base stations 502 use conventional two and four-level FSK. The RF signals transmitted by the communication transceiver 510 to the base stations 502 use four-level FSK. Radio signals received by the receiver 704 produce demodulated information at the output. The demodulated information is coupled to the input of the controller 714, which is utilized as a decoder for decoding outbound messages. During inbound signaling, acknowledgment messages are processed by the controller 714 and delivered to the transmitter 710 for transmission. A power switch 712, which is well known to one of ordinary skill in the art, is coupled to the controller 714, and is used to control the supply of power to the transmitter 710 and receiver 704, thereby providing a battery saving function.

To perform the necessary functions of the communication transceiver 510, the controller 714 preferably includes a microprocessor, a RAM 718, a ROM 717, and a non-volatile memory 716. Preferably, the microprocessor is similar to the DSP56XXX digital signal processor (DSP) family manufactured by Motorola, Inc. It will be appreciated that other similar processors can be utilized for the microprocessor, and that additional processors of the same or alternative type can be added as required to handle the processing requirements of the controller 714. It will be appreciated that other types of memory, e.g., EEPROM or FLASH, can be utilized for the ROM 717, as well as the RAM 718. It will be further appreciated that the RAM 718 and the ROM 717, singly or in combination, can be integrated as a contiguous portion of the microprocessor.

The non-volatile memory 716 includes information such as one or more addresses which are utilized by the communication protocol for identifying the communication transceiver 510, and a transmission table. The transmission table includes a list of valid color codes (CC) and list of valid simulcast frequencies (FO) utilized by the communication system 100. For inbound communication the transmission table includes a list of acknowledgment channel frequencies (FA) and associated message subchannel frequencies (FR), and the time slots (TS) available on the inbound channel. FA and FR are preferably utilized by a communication system employing frequency division multiplexing (FDM). The non-volatile memory can be an EEPROM or flash device external or integral to the controller 714.

The RAM 718 includes a color code memory 720, and a message memory 722. The color code memory 720 is used for storing color codes decoded by the controller 714. The message memory 722 is utilized for storing successfully decoded messages originating from the base stations 502.

The ROM 717 includes firmware utilized by the controller 714 for processing outbound and inbound messages. The firmware comprises an address decoding element 724, a color code decoding element 726, an acknowledgment transmission element 728, and a message receiving element 730, and a message storage element 732. During outbound message processing, the controller 714 calls on the message receiving element 730 for sampling the demodulated signal generated by the receiver 704 converting the demodulated signal to demodulated data. The controller 714 then calls on the address decoding element 724 and the color code decoding element 726 for decoding the address and color code received on the outbound channel, respectively. The controller 714 then compares the decoded address with one or more addresses stored in the EEPROM, and when a match is detected, the controller 714 calls on the message storage element 732 to process the remaining portion of the message. The message storage element 732 performs the function of a memory manager to efficiently utilize message memory.

Once the controller 714 has processed the message a call alerting signal is generated to alert a user that a message has been received. The call alerting signal is directed to a conventional audible or tactile alerting device 736 for generating an audible or tactile call alerting signal. In addition, the controller 714 is programmed to send an acknowledge back response, ACK indicating a successful message reception or a NACK indicating an unsuccessful message reception, depending on the quality of the received message. To send the ACK or NACK(acknowledge back response), the controller 714 calls on the acknowledgment transmission element 728 to send an acknowledge back response to the base stations 502 acknowledging successful, or unsuccessful, reception of the message. The acknowledgment transmission element 728 controls the transmitter 710 which modulates FSK data corresponding to the acknowledge back response.

During a location query, i.e. the reception of the address and color code, made by the base stations 502 to locate the communication transceiver 510, the acknowledgment transmission element 728 selects the least significant hexadecimal digit of the address assigned to the communication transceiver 510 to determine the reserved response time slot which will be used to transmit the acknowledge back response. It will be further appreciate that, alternatively, a random number generator 735 can be provided to further randomize the least significant hexadecimal address digit as described above.

The stored message can be accessed by the user through user controls 734, which provide functions such as lock, unlock, delete, read, etc. More spedfically, by the use of appropriate functions provided by the user controls 734, the message is recovered from the RAM 718, and then displayed on a display 740, e.g., a conventional liquid crystal display (LCD), or played out audibly, in the case of a voice message, by the combination of an audio amplifier and a speaker (not shown).

Figure 9:
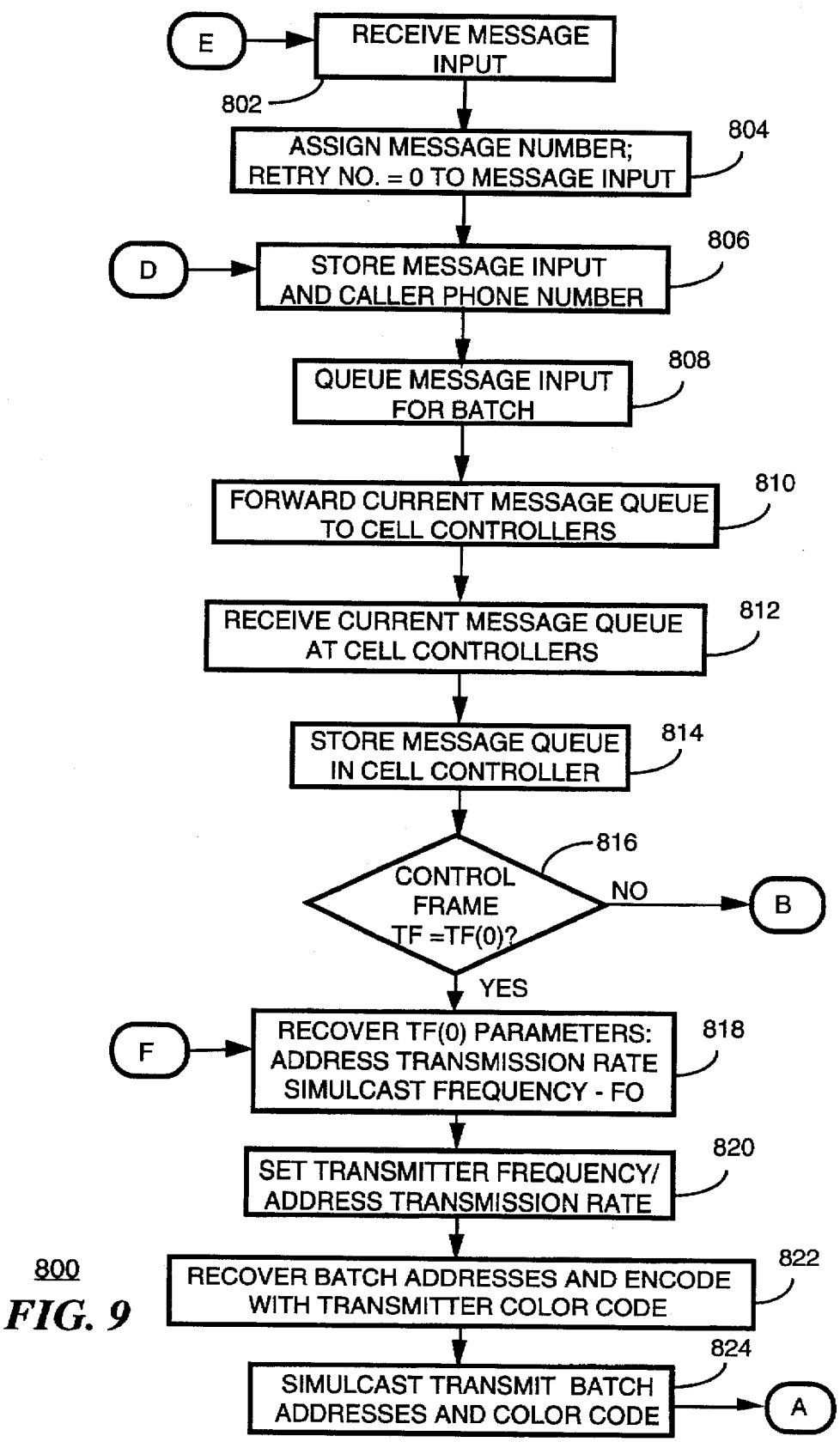

FIGS. 9-14 are flow charts illustrating the operation of the communication system of FIG. 6 in accordance with the present invention. Referring first to FIG. 9, as a message input is received at step 802 the caller's phone number is identified by the system controller 500. The system controller 500 identifies the communication transceiver 510 to which the message is intended from a subscriber list, as is well known to one of ordinary skill in the art, and assigns an address and a message number to the message and a retry number is set to zero at step 804. The address, message, message number, retry number and the caller's phone number are then stored in an active page file at step 806, from which the information will be extracted as will be described below. The system controller 500 then recovers the addresses of communication transceivers 510 for which messages are intended and queues the addresses and associated messages into a batch at step 808. Once the batch queue has been constructed, the system controller 500 forwards the current message queue to the cell controllers 504 at step 810. In step 812 the cell controllers 504 receive the current message queue and then store the current message queue at step 814 in the mass storage media 616. The cell controller 504 then checks if the control frame (i.e., transmission frame 0) is scheduled at step 816. When the control frame is not scheduled, then the cell controller 504 proceeds to step 848 of FIG. 11, as will be described in detail below.

When the control frame is scheduled, at step 816, the cell controller 504 recovers the transmission parameters which include the address transmission rate and the simulcast transmission frequency, at step 818. The cell controller 504 then sets the frequency of the cell transmitter 506 and the address transmission rate, at step 820. The cell controller 504 then recovers batch addresses and encodes the batch addresses with the transmitter color code, at step 822. The batch addresses and color codes are then simulcast transmitted by the cell transmitters 506 at step 824.

Figure 10:
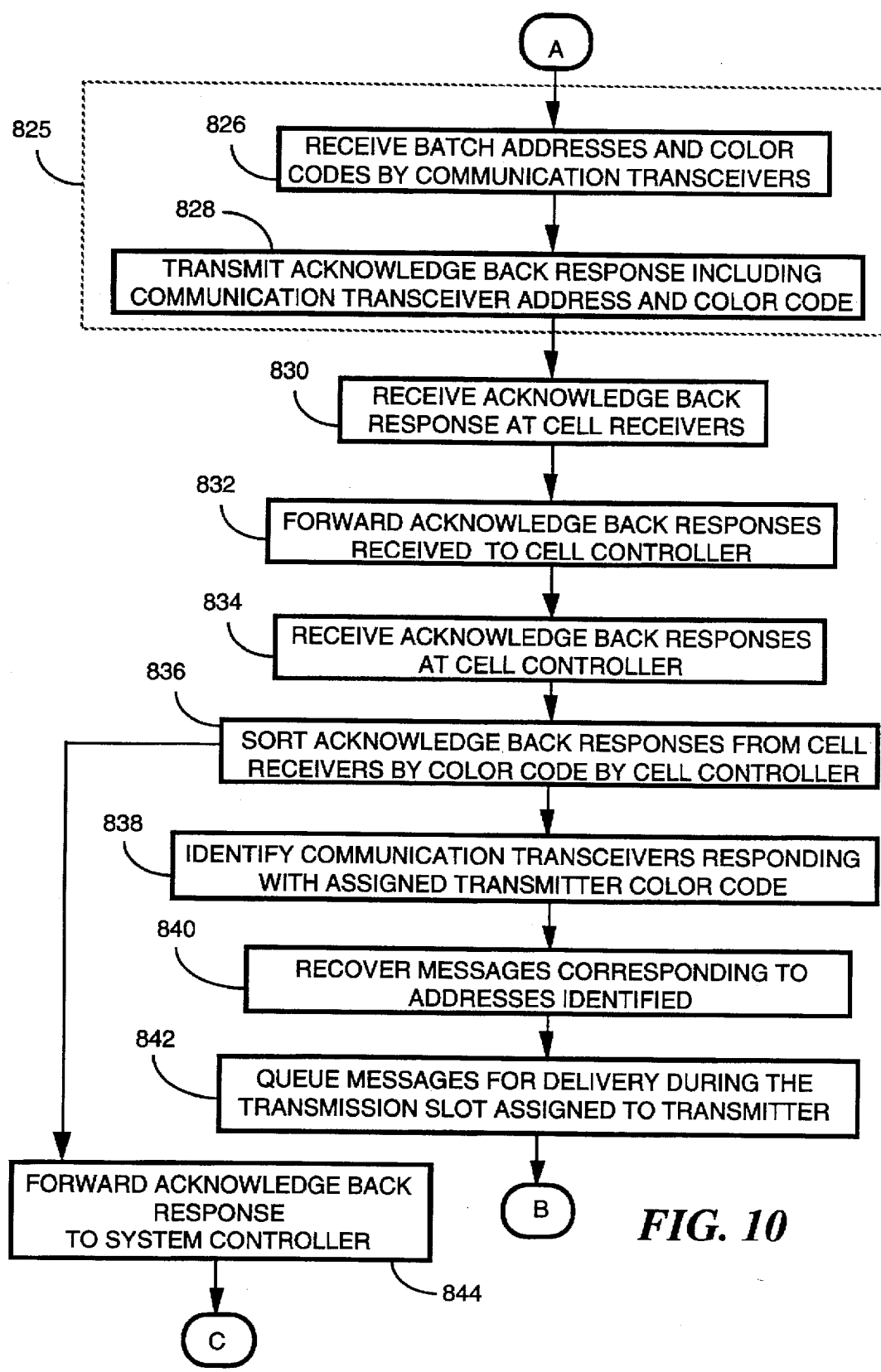

Continuing with FIG. 10, in step 825, which includes step 826 and step 828, the communication transceiver 510 receives the batch addresses and color codes, at step 826, and for the communication transceiver 510 for which the address matches the address assigned, the communication transceiver transmits an acknowledge back response including the communication transceiver address and color code, at step 828. The acknowledge back response is utilized by the cell controller 504 and system controller 500 for identifying the location of the communication transceiver 510, as will be described in further detail below. The cell receivers 512 receive the acknowledge back messages transmitted by the communication transceivers 510, at step 830. The messages received by the cell receivers 512 are then forwarded to the cell controller 504 at step 832 at which time the messages are received by the cell controller, at step 834. In step 836 the cell controller 504 sorts the acknowledge back responses received from the cell receivers 512 by color code. The sorted acknowledge back responses are then forwarded to the system controller 500, at step 844, which then process the acknowledge back responses as will be described below.

The acknowledge back responses, after sorting and deleting duplicate responses at step 836, are used by the cell controller 504 to identify the communication transceivers 510 which responded with the transmitter color code assigned to the geographic region, at step 838. The cell controller 504 then recovers the messages corresponding to the addresses identified, at step 840, and then queues the messages for delivery during the message transmission frame assigned to the communication transceivers 510, at step 842.

Figure 11:
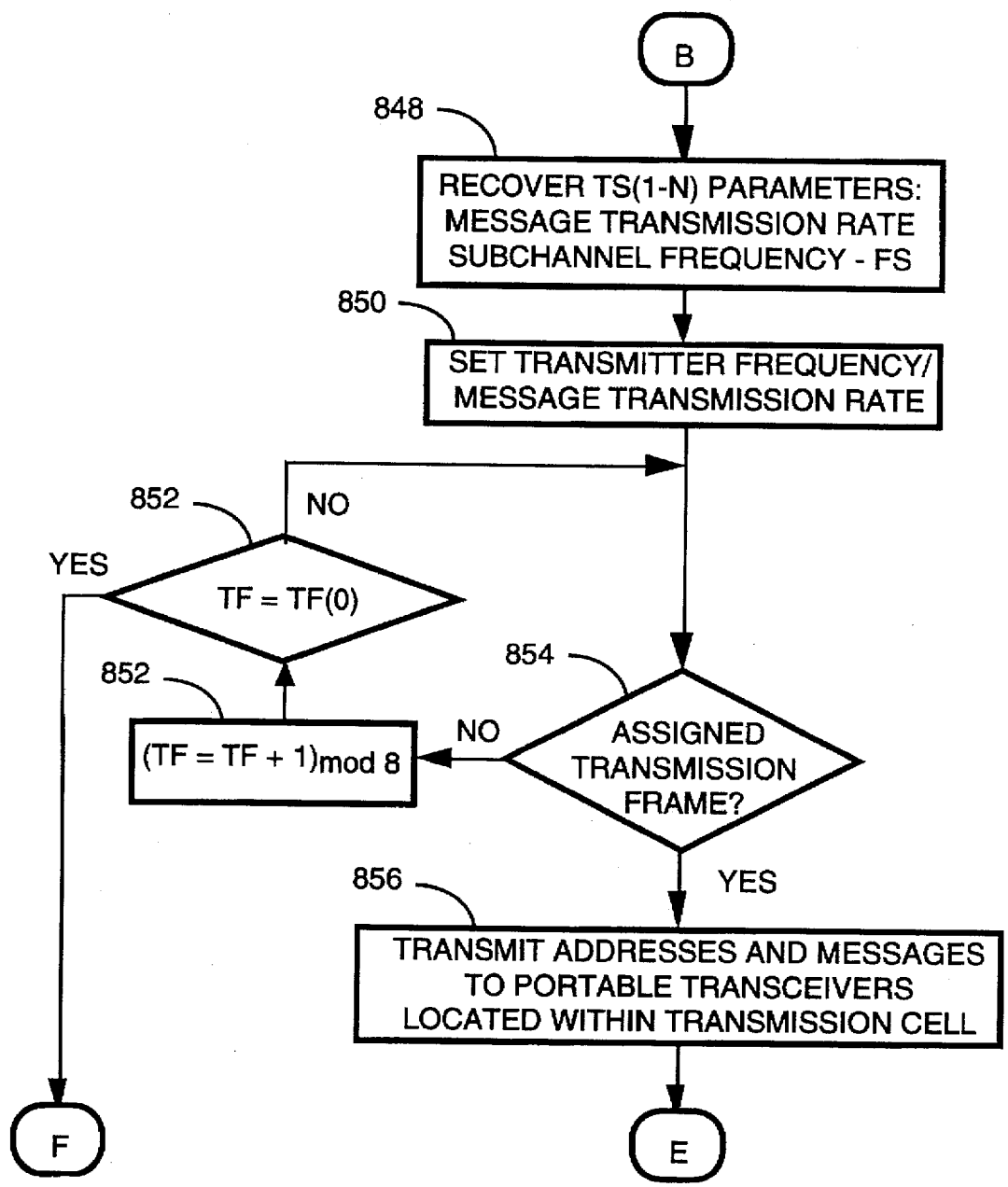

Continuing with FIG. 11, the cell controller 504 recovers transmission frame parameters such as message transmission rate, and subchannel frequency from the non-volatile memory 608, at step 848. The cell controller 504 then proceeds to set the transmitter frequency and message transmission rate of the cell transmitter 506, at step 850. In step 854, the cell controller 504 checks whether the transmission frame assigned to messages is scheduled. When the assigned transmission frame is scheduled, the cell controller 504 instructs the cell transmitter 506 to transmit, at step 856, the addresse(s) and message(s) stored in the current message queue to the communication transceivers 510 located within the transmission cells. Once the address and message transmission is complete, the communication system 100 proceeds back to step 802 of FIG. 9 where the system controller 500 checks for subsequent messages from callers.

Returning to FIG. 11, when the scheduled transmission frame is not assigned for address and message transmission, at step 854, the cell controller 504 increments a transmission frame counter (utilizing modulo 8 addition), at step 851. The cell controller 504 then continues to check whether the transmission frame scheduled is assigned, at step 852. When the next transmission frame scheduled is transmission frame 0 108 (i.e., the control frame), then the cell controller 504 proceeds to step 818 of FIG. 9, as described above.

Figure 12:
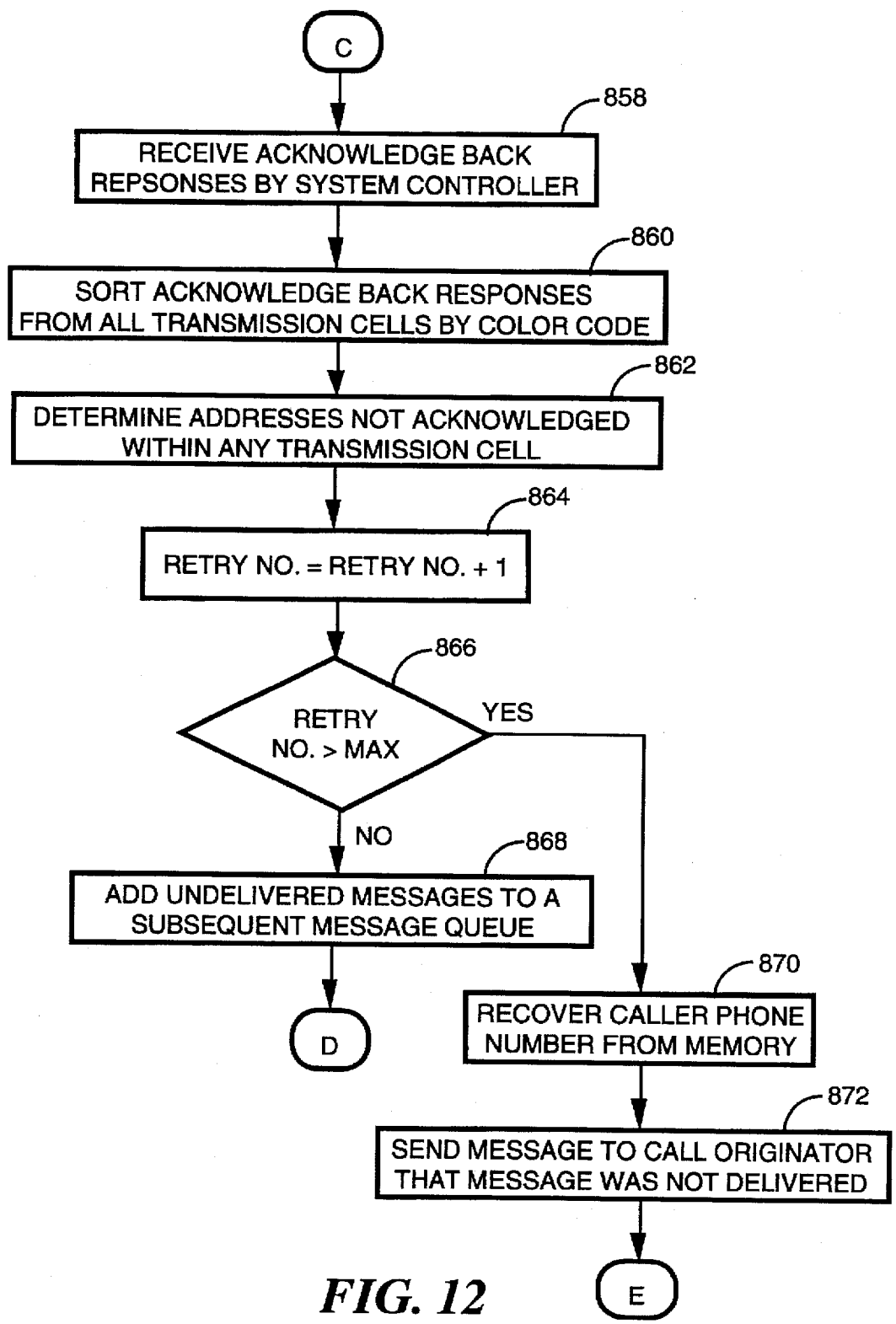

Continuing with FIG. 12, the system controller 500 receives the acknowledge back responses, at step 858, and sorts the acknowledge back responses by color code deleting any duplicate responses, at step 860, to determine the location of all communication transceivers 510 within the communication system. The system controller 500 then determines the addresses of communication transceivers which have not acknowledged, at step 862. In step 864, a retry counter is incremented for each address not acknowledged. When the retry count has exceeded a predetermined retry count, at step 866, and the message has not been acknowledged, the system controller 500 can optionally recover the caller's phone number, at step 870, and send a message to the caller, at step 872, that the message was not delivered, and proceeds back to step 802 of FIG. 8 for receiving subsequent messages. When the retry count has not been exceeded, at step 866, the messages corresponding to unsuccessful acknowledge back responses are added to a subsequent message queue, at step 868 for re-transmission at step 806 of FIG. 9, as described above.

Figure 13:
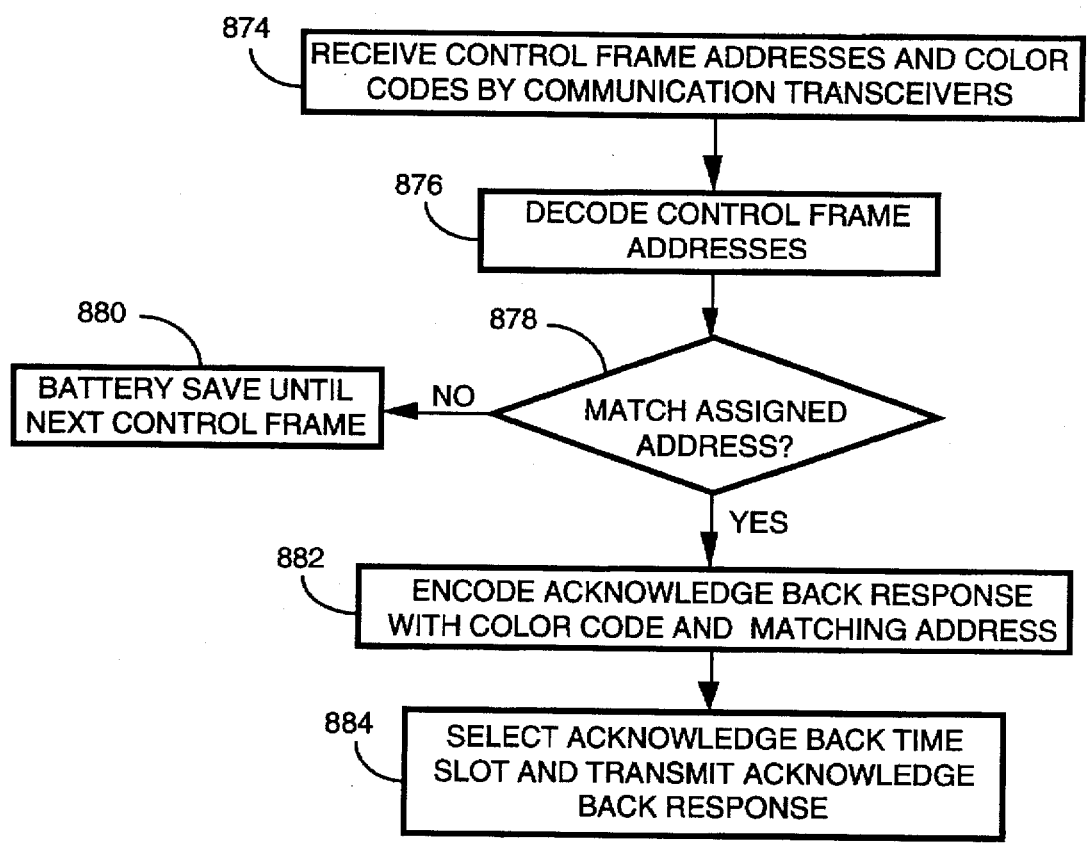

Continuing with FIG. 13, the steps illustrated elaborate in further detail step 825 shown in FIG. 10. The communication transceiver 510 receives the control frame addresses and color codes transmitted by the base stations 502 in the control frame, at step 874. The communication transceiver 510 then proceeds to decode the addresses, at step 876, as described above. In step 878, the communication transceiver 510 checks for a match with the assigned address which are addresses stored in the EEPROM. When a match is not detected, at step 878, the communication transceiver 510 switches to a battery save mode, at step 880 until the next control frame is scheduled. When a match is detected, at step 878, the communication transceiver 510 encodes the acknowledge back response with the color code and address received on the outbound channel, at step 882. In step 884, the communication transceiver 510 selects the reserved response time slot in accordance with the information stored in the EEPROM, as described above. The communication transceiver 510 then proceeds to step 886 where the acknowledge back response is transmitted to the cell receiver 512.

Figure 14:
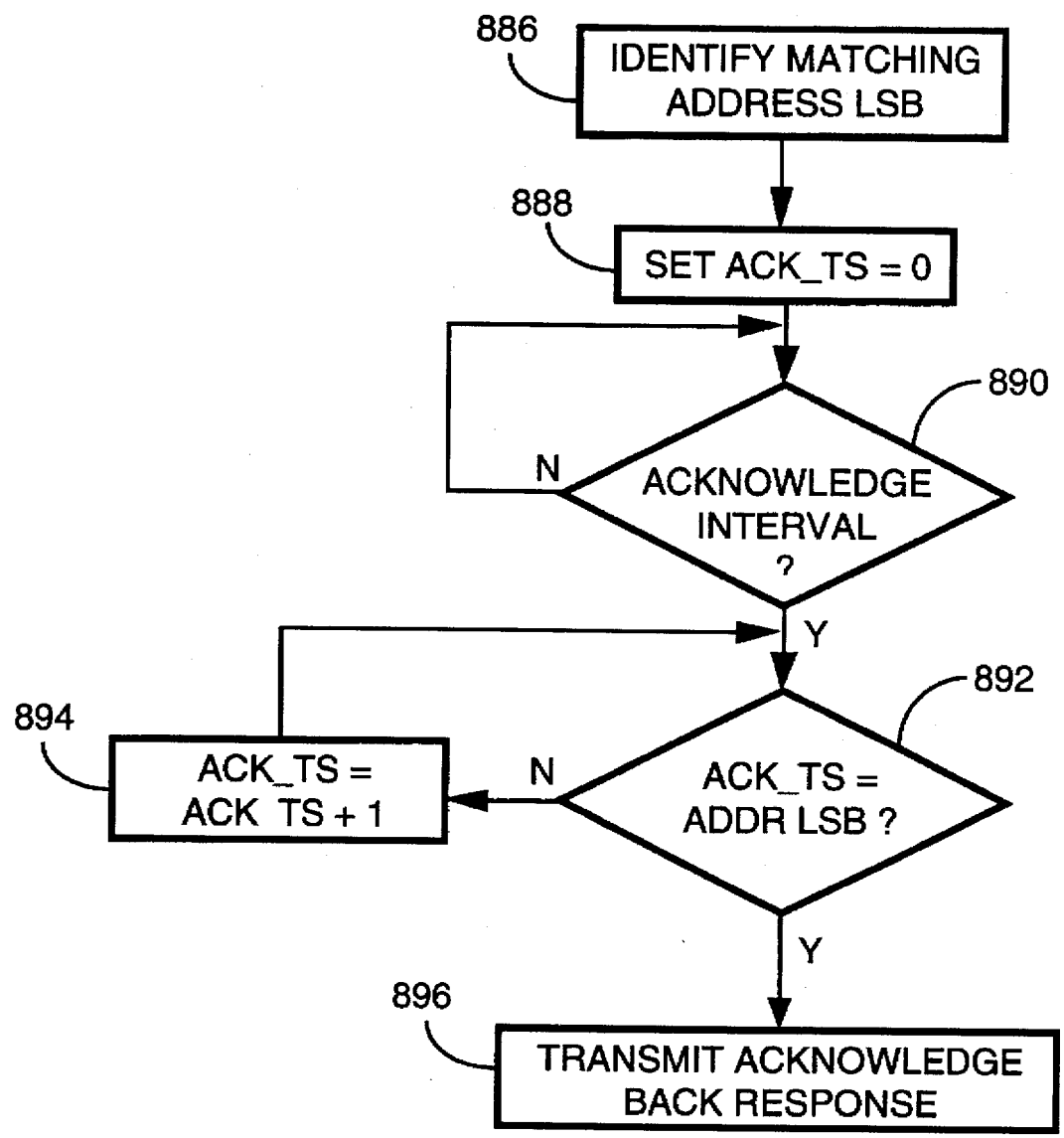

The process by which the communication transceiver 510 selects the reserved response time slot, in step 884 is described in FIG. 14. At step 886, the controller 714 identifies the least significant hexadecimal digit corresponding to the address received on the outbound channel. In step 888, the controller 714 sets a reserved response time slot counter (ACK_TS) to zero. At step 890, the controller 714 waits for the scheduling of the inbound transmission time interval 216. When the inbound transmission time interval 216 is scheduled, at step 890, the controller 714 checks if the current reserved response time slot 224 which corresponds to the least significant hexadecimal digit of the address assigned to the communication transceiver 510 is scheduled, at step 892. When the current reserved response time slot is not scheduled, at step 892, the reserved response time slot counter is incremented at step 894. When the current reserved response time slot 224 which is scheduled, at step 892, matches the least significant hexadecimal digit of the address, the controller 714 proceeds to step 896 where the acknowledgment response is transmitted.

Thus, it should be apparent by now that the present invention provides a communication system 100 and method for optimizing location tracking of communication transceivers 510. In particular, the communication system 100 utilizes the random distribution of communication transceivers 510 throughout the communication system 100 as a method for efficiently tracking the location of the communication transceivers 510 with minimal collisions. Using random acknowledge back responses during the reserved response time slots 224 increases the capacity of communication transceivers 510 queried, in contrast to prior art systems which limit the number of location queries by using scheduled acknowledge back responses. Furthermore, the present invention provides a cost effective method and apparatus for generating random numbers.

What is claimed is:

1. A method for providing unscheduled acknowledge back responses generated by a plurality of communication transceivers operating within a communication system which utilizes time division duplex communication and comprises a plurality of transmission cells defining geographical transmission areas, each of the plurality of transmission cells including one or more cell receivers for receiving unscheduled acknowledge back responses generated by the plurality of communication transceivers and a cell transmitter for transmitting addresses and a color code identifying the cell transmitter, the method for providing the unscheduled acknowledge back responses from communication transceivers comprising the steps of:

receiving, at a communication transceiver, an address corresponding to the communication transceiver and the color code identifying the cell transmitter transmitting the address during a first scheduled time interval;

selecting, in accordance with the address received, a reserved response time slot from a predetermined number of reserved response time slots occurring during a second scheduled time interval to be utilized by the communication transceiver for transmitting an unscheduled acknowledge back response ;and transmitting the unscheduled acknowledge back response during the reserved response time slot selected.

2. The method of claim 1, wherein said step of transmitting the unscheduled acknowledge back responses transmits the addresses identifying the plurality of communication transceivers and the color code identifying the cell transmitter transmitting the addresses to enable locating the plurality of communication transceivers.

3. The method of claim 1, wherein said step of selecting selects a reserved response time slot in accordance with a predetermined number of bits selected from within the addresses received.

4. The method of claim 3, wherein the predetermined number of bits is selected from least significant bits.

5. The method according to claim 1, wherein the predetermined number of reserved response time slots is variable.

6. A communication transceiver, for use in a communication system which utilizes time division duplex communication and comprises a plurality of transmission cells defining geographical transmission areas, each of the plurality of transmission cells including one or more cell receivers for receiving an acknowledge back response generated by the communication transceiver and a cell transmitter for transmitting addresses and a color code identifying the cell transmitter, the communication transceiver comprising:

a receiver for receiving an address and the color code identifying the cell transmitter transmitting the addresses during a first scheduled time interval;

a controller for selecting, in accordance with the address received, a reserved response time slot from a predetermined number of reserved response time slots occurring during a second scheduled time interval to be utilized by the communication transceiver for transmitting the acknowledge back response; and a transmitter for transmitting the acknowledge back response during the reserved response time slot selected.

7. The communication transceiver according to claim 6, wherein the acknowledge back response transmitted includes an address identifying the communication transceiver and the color code identifying the cell transmitter transmitting the addresses to enable locating the communication transceiver.

8. The communication transceiver according to claim 6, wherein the reserved response time slot is selected in accordance with a predetermined number of bits selected from within the addresses received.

9. The communication transceiver according to claim 8, wherein the predetermined number of bits is selected from least significant bits.

10. The communication transceiver according to claim 6, wherein the predetermined number of reserved response time slots is variable.

11. The communication transceiver according to claim 6, further comprising:

a decoder for decoding the addresses received, and for generating in response thereto a control signal when one of the addresses received matches an address assigned to the communication transceiver; and an encoder, responsive to the control signal, for encoding the address assigned to the communication transceiver and the color code identifying the cell transmitter transmitting the addresses within the unscheduled acknowledge back response.

12. The communication transceiver according to claim 6, further comprising a memory for storing a table of reserved response time slots and address bits associated therewith.

13. A communication system utilizing time division duplex communication to provide unscheduled acknowledge back responses, comprising:

a plurality of transmission cells defining geographical transmission areas which include a plurality of cell receivers and a cell transmitter for transmitting addresses and a color code identifying said cell transmitter transmitting the addresses during a first scheduled time interval;

a communication transceiver for receiving an address and the color code identifying the cell transmitter transmitting the address during the first scheduled time interval, the communication transceiver for selecting, in accordance with the address received, a reserved response time slot from a predetermined number of reserved response time slots occurring during a second scheduled time interval to be utilized for transmitting an unscheduled acknowledge back response, and for transmitting the unscheduled acknowledge back response during the reserved response time slot selected;

at least one of the plurality cell receivers for receiving the unscheduled acknowledge back response transmitted within the predetermined number of reserved response time slots during the second scheduled time interval; and said cell transmitter, identified by the color code received by the at least one of the plurality of cell receivers, further transmitting addresses identifying communication transceivers for which messages are intended and the messages during one of a sequence of scheduled message transmission frames designated by the color code.

14. The communication system according to claim 13, wherein said step of transmitting the unscheduled acknowledge back responses transmits the addresses identifying the plurality of communication transceivers and the color code identifying the cell transmitter transmitting the addresses to enable locating the plurality of communication transceivers.

15. The communication system according to claim 13, wherein said step of selecting selects a reserved response time slot in accordance with a predetermined number of bits selected from within the addresses received.

16. The communication system according to claim 15, wherein the predetermined number of bits is selected from least significant bits.

17. The communication system according to claim 13, wherein the predetermined number of reserved response time slots is variable.

18. The communication system according to claim 13, further comprising:

a cell controller, coupled to said cell transmitter, for controlling transmission of the addresses and the color code identifying said cell transmitter transmitting the addresses during the first scheduled time interval and further for controlling transmission of the addresses identifying communication transceivers for which messages are intended during one of the sequence of scheduled message reuse slots designated by the color code identifying the cell transmitter; and a system controller, coupled to said cell controller, for receiving the messages intended for said communication transceivers, and further for distributing the messages received to cell controllers.

19. The communication system according to claim 18, wherein said cell controller comprises:

a first memory for storing the color code identifying the cell transmitter and a transmission frame corresponding to one of the sequence of scheduled message reuse slots designated by the color code identifying the cell transmitter; and a second memory for storing the addresses identifying communication transceivers for which messages are intended and the messages corresponding thereto which are distributed from said system controller.

20. The communication system according to claim 19, wherein said second memory further stores the unscheduled acknowledge back responses received, and wherein said cell controller further comprises a means for comparing the unscheduled acknowledge back responses stored in said second memory with the color code stored in said first memory, and in response to a match between the unscheduled acknowledge back responses stored and the color code stored, for effecting transmission of the addresses and the messages corresponding thereto during the scheduled message reuse slot.

* * * * *